United States Patent [19]

Pawlitschek

[11] 4,135,339

[45] Jan. 23, 1979

[54] SLATTED FLOOR SYSTEM

[76] Inventor: Donald P. Pawlitschek, R.R. #2, Heron Lake, Minn. 56137

[21] Appl. No.: 798,751

[22] Filed: May 20, 1977

[51] Int. Cl.² ............................................ A01K 1/015
[52] U.S. Cl. ...................................... 52/660; 52/729; 119/28
[58] Field of Search ................. 52/660, 663, 730, 180, 52/666, 729, 588; 119/28, 20, 19

[56] References Cited

U.S. PATENT DOCUMENTS

| 1,485,246 | 2/1924 | Brown | 52/729 |
|---|---|---|---|
| 2,711,231 | 6/1955 | Spangler | 52/729 |
| 2,931,468 | 4/1960 | Keller | 52/663 |
| 3,110,374 | 11/1963 | Valverde | 52/729 |
| 3,416,280 | 12/1968 | Young | 52/729 |
| 3,716,027 | 2/1973 | Vickstrom | 52/588 |
| 3,757,743 | 9/1973 | Lehe | 119/28 |
| 3,911,639 | 10/1975 | Rachlin | 52/220 |
| 4,001,993 | 1/1977 | Daniels | 52/660 |
| 4,002,000 | 1/1977 | Howard | 52/729 |

FOREIGN PATENT DOCUMENTS

| 1002955 | 3/1952 | France | 52/368 |
|---|---|---|---|
| 684800 | 2/1961 | Italy | 52/221 |

Primary Examiner—Ernest R. Purser
Assistant Examiner—Henry Raduazo
Attorney, Agent, or Firm—Dorsey, Windhorst, Hannaford, Whitney & Halladay

[57] ABSTRACT

According to the present invention, a slatted floor system comprises a plurality of elongated, spaced, generally parallel slats. Each slat has a top, load-carrying surface with spaced apart, opposite outer edges; a bottom surface substantially parallel to the top surface; and a pair of side surfaces integral with the top surface and the bottom surface. The side surfaces are joined with the top surface along lines recessed from the outer edges of the top surface. The side surfaces further taper toward each other in first portions, adjacent the top surface, then extend substantially parallel to each other and vertically relative to the bottom surface in second portions, thereby forming with the top and bottom surfaces a generally Y-shaped, enclosed main compartment. Each slat also includes a first pair of projection receiving means extending longitudinally along the tapered first portion of its side surfaces and a second pair of projection receiving means extending longitudinally along the second portion of the side surfaces. Adjacent slats are connected and locked in spaced-apart relationship by a plurality of connectors. Each connector has a first pair of projections, with each projection being receivable by one of the first pair of projection receiving means on each of two adjacent slats, and a second pair of projections, with each projection being receivable by one of the second pair of projection receiving means on each of two adjacent slats. At least one of the first and second pairs of projections on the connector is adapted to interlock with its corresponding projection receiving means on adjacent slats.

15 Claims, 4 Drawing Figures

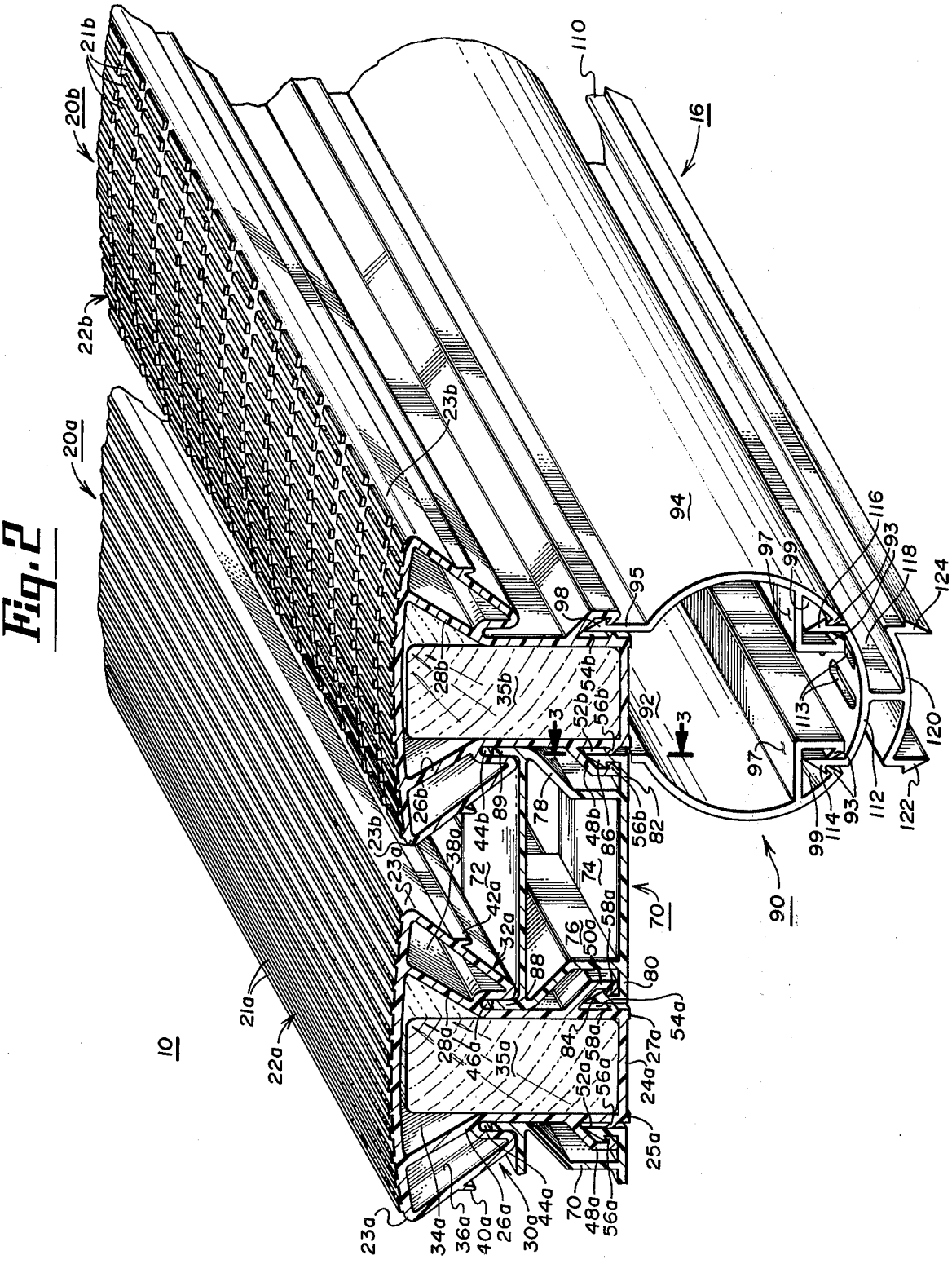

SLATTED FLOOR SYSTEM

BACKGROUND OF THE INVENTION

1. Field of the Invention

The present invention relates to a floor system, and, more particularly, to a floor system made up of elongated slats and connector-spacers for holding the slats together in spaced relation. Although the invention is particularly applicable to a slatted floor used in raising farm animals in a confined area and will be described primarily with reference thereto, the invention can be used for any slatted floor arrangement in which a permanent, easily assembled, slatted floor is desired.

2. Description of the Prior Art

Recognition that sanitation and animal safety and comfort are important factors in the profitable production of farm animals raised in confinement has led to the manufacture of a variety of slatted flooring systems. Most of these are used in animal enclosures which have a slatted floor area in the central portion of the enclosure under which is located a pit into which animal waste matter drops for later removal.

A variety of materials appear in the slatted floor systems of the prior art, including wood, concrete, aluminum, steel and plastic. The prior art slatted floor systems have also featured a variety of configurations for slat members, including solid slats, U-shaped and E-shaped channel members and substantially square hollow members. Associated with these slat configurations are numerous designs for the interconnecting parts used to hold and space the slats. Among the more recent examples of slatted floor systems are those shown in the patents to Lehe and Lehe et al. (U.S. Pat. Nos. 3,742,911; 3,757,743; 3,804,067; 3,837,319), Vickstrom and Vickstrom et al. (U.S. Pat. Nos. 3,716,027; 3,721,215; 3,722,473; 3,722,474), Bowser (U.S. Pat. No. 3,995,593), Boswer et al. (U.S. Pat. No. 3,730,140), Becker (U.S. Pat. No. 3,815,550) and Jones et al. (U.S. Pat. No. 3,809,014).

Each of the slatted floor systems found in the prior art suffers from one or more disadvantages based on the material from which it is made, or its configuration. A floor system using wood slats easily becomes coated and saturated with animal waste matter, thereby becoming very slippery and also unsanitary. Slats made of concrete or metals such as steel or aluminum are typically good heat conductors and therefore feel less comfortable to animals. In addition, prior art slats are frequently difficult to assemble, may suffer from corrosion caused by animal wastes, may cause foot injuries to the confined animals and may not have sufficient structural strength to resist the torsion loading caused by the considerable weight of animals walking on them. Further significant disadvantages of prior art slat systems are their inability to span all but the shortest distances without intermediate support and their sanitation problems, caused by the accumulation of animal waste on slats and the difficulty of easily washing away such waste.

SUMMARY OF THE INVENTION

The present invention is for an improved slatted floor system which is easily assembled, provides firm footing and comfort to confined animals, resists corrosion, discourages accumulation of animal waste, is easily cleaned and can be used to span significantly greater distances than prior art slats. According to the present invention, a slatted floor system comprises: a plurality of elongated, spaced, generally parallel slats. Each slat has a top, load-carrying surface with spaced apart, opposite outer edges; a bottom surface substantially parallel to the top surface; and a pair of side surfaces integral with the top surface and the bottom surface. The side surfaces are joined with the top surface along lines recessed from the outer edges of the top surface. The side surfaces further taper toward each other in first portions, adjacent the top surface, then extend substantially parallel to each other and vertically relative to the bottom surface in second portions, thereby forming with the top and bottom surfaces a generally Y-shaped, enclosed main compartment. Each slat also includes a first pair of projection receiving means extending longitudinally along the tapered first portion of its side surfaces and a second pair of projection receiving means extending longitudinally along the second portion of the side surfaces. Adjacent slats are connected and locked in spaced-apart relationship by a plurality of connectors. Each connector has a first pair of projections, with each projection being receivable by one of the first pair of projection receiving means on each of two adjacent slats, and a second pair of projection receiving means on each of two adjacent slats. At least one of the first and second pairs of projections on the connector is adapted to interlock with its corresponding projection receiving means on adjacent slats.

It is an object of the present invention to provide a slatted floor system which is easily assembled.

It is another object of the present invention to provide a slatted floor system which discourages accumulation of waste materials on and between the slats and their connector-spacer elements.

It is a further object of the present invention to provide a slatted floor system which is easily cleaned.

It is still another object of the present invention to provide a slatted floor system in which the slats can internally receive a reinforcing member.

It is a still further object of the present invention to provide a slatted floor system in which the slat members can cover long spans without twisting and buckling under load.

It is a still further object of the present invention to provide a slatted floor system to which auxiliary elements can be attached to aid in heating, cooling and ventilation.

These and other objects of the invention will become apparent from a study of the following description of the preferred embodiments, including the accompanying figures.

BRIEF DESCRIPTION OF THE DRAWINGS

FIG. 2 is a pictorial view of a portion of an assembled floor according to the present invention showing slat members, connector-spacers and auxiliary elements, comprising a delivery tube and an air guide.

DESCRIPTION OF THE PREFERRED EMBODIMENTS

Figure 1:
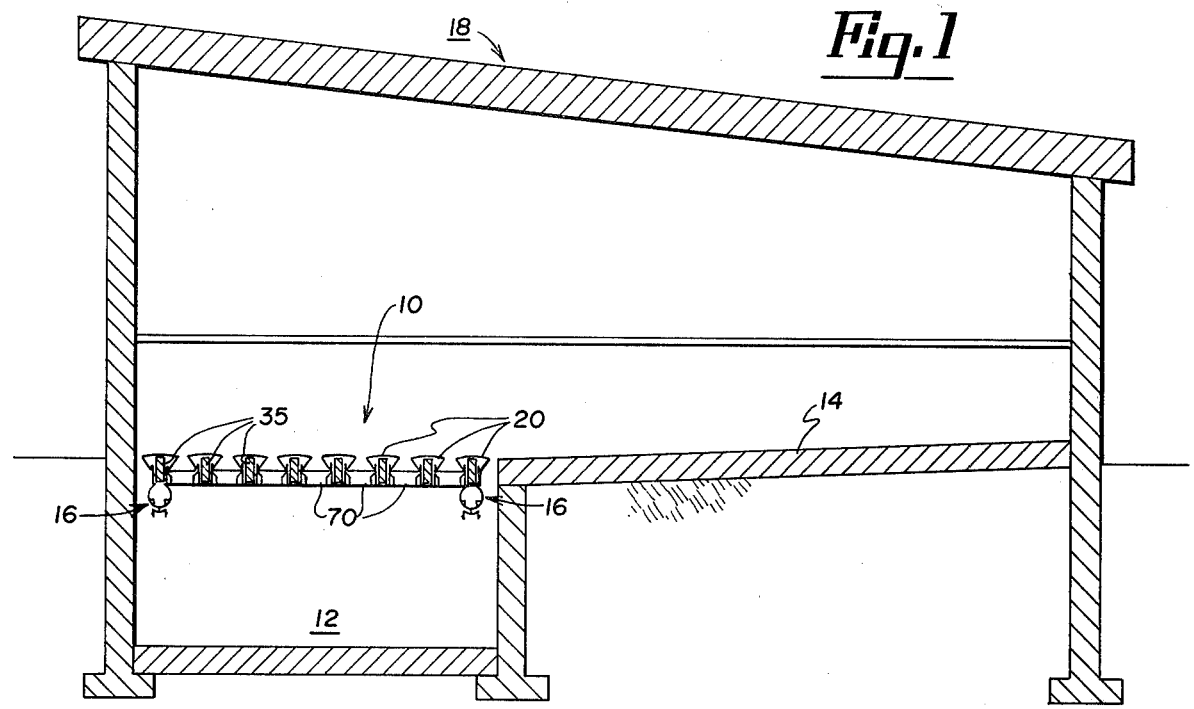
FIG. 1 is a cross-sectional view of an animal confinement house showing use of the slatted floor system of the present invention.

A typical environment for the slatted floor system 10 of the present invention is seen in FIG. 1, which shows a cross section of a roofed animal confinement house 18. A sloping floor 14 of cast concrete or other solid material covers one portion of the floor of the confinement house 18. A second portion of the floor is formed by an assembled section of the slatted floor system 10 of the present invention, located over a waste pit 12, into which animal waste materials fall upon passing through openings in the slatted floor system 10. As further seen in FIG. 1, the slatted floor system 10 is made up of an array of parallel elongated slats 20 between which are located connector-spacers 70. Auxiliary members 16 may be mounted to the underside of the slatted floor system 10 for heating, cooling or ventilation purposes.

Referring now also to FIG. 2, a more detailed view of the slatted floor system 10 constructed according to the present invention is seen. In the segment of slatted floor shown in FIG. 2, the two basic types of members making up the floor system 10 can be seen: (1) elongated slats 20a, 20b and; (2) a connector-spacer member 70 which is located between the two slats 20a, 20b. Also shown in FIG. 2 are two types of auxiliary members 16 which are used with the slatted floor system 10. These are a delivery tube 90 and a reversible air guide 110. In the following the slatted floor system 10 will be described in terms of the segment of floor shown in FIG. 2, it being obvious that a complete floor is produced by generalizing from the two slat segment to an array as shown in FIG. 1 containing a larger number of slats 20 and connector-spacers 70.

The slats 20a, 20b of the present invention have a box beam construction which yields a unique cross-sectional configuration. Although described herein as a combination of several parts, the slats 20a, 20b are preferably formed as a single integral piece. In the preferred embodiment, the slats 20a, 20b are produced by an extrusion process using a type of virgin polyvinyl chloride, such as that manufactured by B. F. Goodrich under the trade name GEON 7082.

As seen in FIG. 2, the slats 20a, 20b comprise first or top surfaces 22a, 22b, respectively, and second or bottom surfaces 24a, 24b, respectively, which are smaller in width than the top surfaces 22a, 22b and substantially parallel thereto. In the preferred embodiment, the bottom surfaces 24a, 24b are substantially flat while the top surfaces 22a, 22b are slightly crowned such that they are concave downward, as viewed in FIG. 2. The top surfaces 22a, 22b also preferably incorporate some means for improving traction. This means for improving traction can consist either of narrow ribs 21a running longitudinally (slat 20a) or a grid type non-skid surface in which longitudinal ribs are interrupted at intervals to provide an array of small rectangular projections 21b (slat 20b).

Because the remaining structure of the slats 20a, 20b is the same for each, the discussion will proceed with reference to the left-hand slat 20a, and its constituent parts, as denoted with reference numerals having an "a" suffix. The discussion is equally applicable to the right-hand slat 20b, the constituents of which are labeled with corresponding index numbers differing only by the suffix "b". A pair of substantially symmetrical side surfaces 26a, 28a connect the top surface 22a of the slat 20a to the bottom surface 24a. These side surfaces 26a, 28a are joined with the top surface 22a along parallel lines which are somewhat recessed from the spaced-apart, opposite outer edges 23a of the top surface 22a. From these lines of connection with the top surface 22a, the side surfaces 26a, 28a taper inward toward each other for approximately one-third of the distance between the top surface 22a and the bottom surface 24a of the slat 20a. Following this tapered portion, the side surfaces 26a, 28a extend downward toward the bottom surface 24a in a direction substantially perpendicular to the bottom surface 24a. Accordingly, the top surface 22a, the bottom surface 24a and the side surfaces 26a, 28a form an enclosed main compartment 34a which may be described as being generally Y-shaped when viewed as shown in FIG. 2.

The substantially rectangular lower portion of the main compartment 34a is adapted to receive a rectangular reinforcing member 35a. In the preferred embodiment, the slat 20a is sized such that a wooden beam, commonly referred to as a two-by-four, can be inserted into the main compartment 34a. When so inserted, the wide sides of the two-by-four reinforcing member 35a rest snugly against the lower, perpendicular portions of the side surfaces 26a, 28a and the narrow edges of the two-by-four reinforcing member 35a rest near the top surface 22a and against the bottom surface 24a of the slat 20a.

Located below the top surface 22a and on either side of the upper, tapered portions of the main compartment 34a are two substantially symmetrical, enclosed secondary compartments 36a, 38a, respectively, formed by channels 30a, 32a which, in cross section, are generally shaped like V's with uneven legs. These channels 30a, 32a are joined at one edge to the outer edges 23a of the top surface 22a and at the other edge are joined to the side surfaces 26a, 28a along substantially parallel lines near the termination of the inwardly tapered portions of the side surfaces 26a, 28a. The position and configuration of these channels 30a, 32a is such that they form a first pair of substantially parallel, narrow, downwardly directed grooves 44a, 46a in combination with the substantially perpendicular lower portions of the side surfaces 26a, 28a.

Located on each of the channels 30a, 32a below the outer edges 23a of the top surface 22a are ribs 40a, 42a which extend longitudinally along the channels 30a, 32a. These ribs 40a, 42a serve as waste drip lips on which liquid waste beads. This prevents the waste from flowing all the way down the outside of the slat 20a by causing it to bead and drop straight down into the waste pit 12 below.

Located at either edge of the bottom surface 24a are small ribs 25a, 27a which extend the length of the bottom surface 24a. These ribs 25a, 27a act as rest points when the slat 20a is placed on a support beam (not shown). This ensures that the slat 20a rests stably despite minor variations in flatness of the bottom surface 24a. The ribs 25a, 27a also serve as secondary drip lips for any liquid waste which manages to reach that part of the slat 20a.

On each of the side surfaces 26a, 28a near the edges of the bottom surface 24a are located narrow angle-bent flanges 48a, 50a which extend longitudinally the length of the slat 20a. The angle-bent flanges 48a, 50a in combination with the lower portion of the side surfaces 26a, 28a form a second pair of substantially parallel, narrow, downwardly directed grooves 52a, 54a which extend longitudinally along the lower edges of the slat 20a.

Inside the grooves 52a, 54a near their openings are paired ribs 56a, 58a, respectively, which extend longitudinally inside the grooves 52a, 54a. As explained in greater detail below, these ribs 56a, 58a assist in holding connector-spacers 70 in place.

Turning now to the means for interconnecting the slats 20a, 20b, FIG. 2 shows a connector-spacer 70 located between the slats 20a, 20b and interlocking therewith. A portion of a second, identical connector-spacer 70 is shown to the left of the left-hand slat 20a. The connector-spacer 70 has a general shape which is somewhat similar to that of the main compartment 34a of the slat 20a, i.e., generally in the form of a "Y". That is, the connector-spacer 70 has a substantially flat top surface 72, a somewhat narrower bottom surface 74 lying substantially parallel to said top surface 72 and side surfaces 76, 78 each of which has an upper, inwardly tapering portion and a lower, substantially vertical portion. Along the outer edges of the top surface 72 of the connector-spacer 70 are located a first pair of flanges 88, 89 which are upwardly directed and extend longitudinally along the outer edges of the connector-spacer 70. Located along the lower edges of the connector-spacer 70 are a second pair of flanges 80, 82 which are generally L-shaped, extending outwardly in the plane of the bottom surface 74 of the connector-spacer 70 and then at right angles upward toward the top surface 72. The edges of each of the upwardly turned portions of the flanges 80, 82 are equipped with projections 84, 86 which appear as half-arrowhead barbs when viewed in cross section.

Coordination and interconnection of the slats 20a, 20b and the connector-spacer 70 is as follows. As best seen in FIG. 2, the first and second pairs of upwardly turned flanges 80, 82, 88, 89 on the connector-spacer 70 are received by the first and second pairs of downwardly directed grooves 46a, 44b, 54a, 52b of adjacent slat members 20a, 20b. The pair of flanges 88, 89 located near the top edges of the connector-spacer 70 fit into grooves 46a, 44b in adjacent slats 20a, 20b; similarly, the flanges 80, 82 at the lower edges of the connector-spacer 70 fit into the grooves 54a, 52b of adjacent slats 20a, 20b. The projections 84, 86 on the ends of upturned flanges 80, 82 engage the paired ribs 58a, 56b associated with grooves 54a, 52b to lock the connector-spacer 70 into position. When locked into position in this manner, the connector-spacer 70 has four independent lines of engagement with the adjacent slats 20a, 20b, including both high and low lines of engagement on each of the slats 20a, 20b.

As shown in FIG. 1, the basic configuration of the slats 20 and the connector-spacers 70 can be supplemented with auxiliary members 16 to produce a slatted floor 10 which can deliver air for heat or ventilation, guide liquids, or provide a channel through which wire, flexible tubing, and the like can be threaded. To accomplish this, auxiliary members 16 are attached to the underside of the slats 20. The use of two types of auxiliary members 16, a delivery tube 90 and an air guide 110 is shown in greater detail in FIG. 2.

Figure 3:
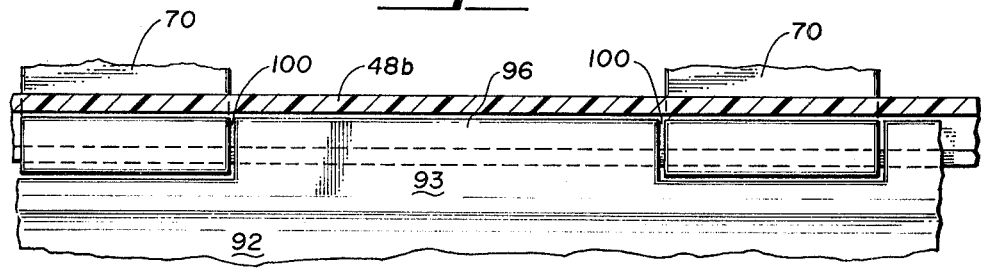
FIG. 3 is a section view taken along line 3—3 of FIG. 2 and showing the coordination of the delivery tube with the connector-spacers.

As seen in FIG. 2, using a single slat 20b as example, a delivery tube 90 is made up of two elongated tube segments 92, 94. The tube segments 92, 94 are oppositely curved and have means for attachment to the slat 20b at their upper edges. These means for attachment comprise, in the preferred embodiment, substantially flat flanges 93 (FIG. 3), 95 which have projections 96 (FIG. 3), 98, similar to those on the flanges 80, 82 of the connector-spacer 70. These flanges 93, 95 with projections 96, 98 are received by the grooves 52b, 54b at the bottom of the slat 20b and lock into place in much the same manner as the flanges 84, 86 of the connector-spacer 70. As shown in FIG. 3, to accomodate the presence of connector-spacers 70 in the same groove 52, as the flange 93, notches 100 appear in the flange 93 at appropriate intervals. At the lower edges of the tube segments 92, 94 are located a pair of right angle flanges 97 which, in combination with the lower portions of the tube segments 92, 94, form a pair of grooves 99. These grooves 99 each have a pair of ribs 93 extending longitudinally along their interiors in a manner similar to the ribs 56a, 58a at the lower edges of the slat 20a.

The second auxiliary member, the air guide 110, completes the cylindrical tube partially formed by the tube segments 92, 94. The air guide 110 is an elongated member consisting of first and second channels 112, 120, respectively, joined back-to-back by a rib 118 which extends along their length. The first channel 112 is curved slightly and is sized to span the gap between the two tube segments 92, 94. The second channel 120 is also slightly curved and of the same width as the first. Both of the channels 112, 120 have projections 114, 116, 122, 124 along their edges which are similar to those found on the lower flanges 80, 82 of the connector-spacers 70 and on the flanges 93, 95 at the upper edges of the two tube segments 92, 94. The projections 114, 116, 122, 124 on the channels 112, 120 are designed to interlock with the grooves 99 at the lower edges of the two tube segments 92, 94. When either of the two channels 112, 120 is attached to the two tube segments 92, 94 by this means, a substantially cylindrical assembly results, consisting of the two tube segments 92, 94 and one of the two channels 112, 120, which form the air guide 110.

For purposes of ventilation the first channel 112 of the air guide 110 has a number of apertures 113, in the preferred embodiment elongated slots, and is upwardly curved when attached as in FIG. 2; the second channel 120 is also upwardly curved, again as seen in FIG. 2. Thus, when air is forced into the delivery tube 90, it exits through the apertures 113 in the channel 112 and is deflected upward between the slats 20a, 20b by the second channel 120. Conversely, when air is exhausted from the delivery tube 90, it flows in between the channels 112, 120, is deflected upward by the rib 118 and enters the delivery tube 90 through the apertures 113.

In the preferred embodiments of the auxiliary members 16, the width of the two channels 112, 120 not only matches the gap between the lower edges of the tube segments 92, 94 but also the distance between the grooves 52b, 54b adjacent the bottom surface of the slat 20b. When, in addition, the projections 114, 116, 122, 124 on the channels 112, 120 match the grooves 52b, 54b of the slat 20b, the assembly consisting of the two tube segments 92, 94 can be removed and the air guide 110 can be attached directly to the slat 20b in either of two positions, depending on which of the two channels 112, 120 is adjacent the slat 20b. In this way a passageway for wires, tubing or the like may be formed. When the air guide 110 is used in this fashion without the two tube segments 92, 94, it also must be notched to accommodate the connector-spacers 70, in the same fashion as described above with respect to the tube segments 92, 94.

Referring now again to FIGS. 1 and 2, assembly of a floor using the floor slat system 10 of the present invention is accomplished as follows. First, slats 20 of the appropriate length are selected. Once the length of span for the slats 20 is known, it can be determined whether use of reinforcing members 35 placed inside the slats 20 is desirable. It has been found that with the use of a two-by-four wooden reinforcing member, distances of eight feet can be spanned with a typical confined animal load. Once these matters are determined, the slats 20, with or without reinforcing members 35, can be assembled. As seen in FIG. 2, the floor is built by placing two slats 20a, 20b adjacent each other and snapping the connector-spacer 70 in by pressing it upward into the grooves 54a, 52b, 46a, 44b. For efficient assembly, the slats 20a, 20b can be marked with suitable indicators (not shown) which denote where the connector-spacers 70 should be placed to achieve optimal spacing consistent with structural stability. Once the connector-spacers 70 are in place, they are extremely difficult to remove because of the interlocking of projections 84, 86 and ribs 58a, 56b. This interlocking arrangement insures that the slats 20a, 20b will not come apart easily even when subjected to large vertical loads and/or torsion loading which may cause some deflection of the slats 20a, 20b. When the delivery tube 90 and/or the air guide 110 are used with a floor system 10, these can be snapped into place by the same sort of upward pressure used with the slats 20a, 20b and the connector-spacers 70. Connection to fans or pumps is made by any suitable means linked to the ends of the delivery tube 90.

A floor system assembled in the above manner not only can carry a great deal of weight, particularly when used in connection with reinforcing members 35, but also, due to its box beam construction, has resistance to torsion loads placed on the edges of the slats 20. As best seen in FIG. 2, when reinforcing members 35a, 35b are used, the Y-shaped design of the main compartments 34a, 34b effectively transfers load forces from the slats 20a, 20b to the reinforcing members 35a, 35b. This is accomplished (using the slat 20a as an example) through the lower, perpendicular portions of the side surfaces 26a, 28a, which rest against the reinforcing member 35a, and by the tapered portions of the side surfaces 26a, 28a. Through this structural configuration a portion of any vertical load placed on the top surface 22a is transformed into a horizontal force, which tends to compress the reinforcing member 35a. Vertical loads can also be transferred through the top surface 22a directly to the reinforcing member 35a.

The above-described structure of the slatted floor system 10 of the present invention also facilitates maintaining the slats 20a, 20b in a sanitary condition. As may be seen from FIG. 2, much of the animal waste which would fall on the top surface 22a of the slat 20a will simply flow off toward the edges 23a, due to the crowned configuration of the top surface 22a. Waste which clings to the top surfaces 22a and flows around the edges 23a will flow downward across the channels 30a, 32a until it reaches the ribs 40a, 42a which act as waste drip lips. Here the waste will form into droplets which ultimately break loose from the ribs 40a, 42a and fall down into the waste pit 12 below. Moreover, because each of the grooves 44a, 46a, 52a, 54a are downwardly directed and because the main and secondary compartments 34a, 36a, 38a are fully enclosed, there are fewer places on the slat 20a for waste to accumulate and to build a breeding ground for disease-carrying bacteria.

To ensure that the floor system 10 remains as sanitary as possible, the slats 20a, 20b can be cleaned by means of a high-pressure spray directed to the top surfaces 22a, 22b and in between the slats 20a, 20b. When such a spray is used, the ribs 40a, 42a, 40b, 42b, normally serving as waste drip lips, additionally serve as deflectors which direct the high-pressure spray against the lower portion of an adjacent slat, allowing any accumulations of manure on this lower portion to be removed.

Figure 4:
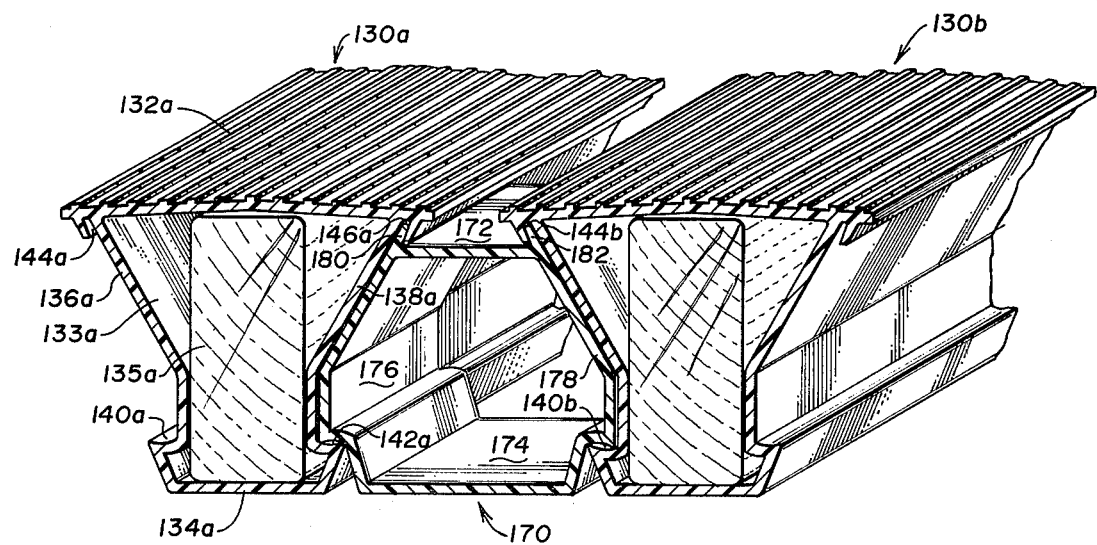
FIG. 4 is a pictorial view of an alternate embodiment of the floor system of the present invention.

Shown in FIG. 4 is an alternate embodiment of the present invention which incorporates the advantages of the previously described embodiment but has a somewhat simplified structure. In this embodiment, the basic slat member 130a (the description also applies to the slat 130b, with a substitution of the suffix "b" in each index number) also comprises a top surface 132a, and a bottom surface 134a which is smaller in width than the top surface 132a and is substantially parallel thereto. A pair of substantially symmetrical side surfaces 136a, 138a connect the top surface 132a with the bottom surface 134a forming a Y-shaped compartment 133a sized to receive a reinforcing member 135a. The side surfaces 136a, 138a taper inward for a first portion of the distance between the top surface 132a and the bottom surface 134a and then extend downward in a substantially vertical direction for a second portion of the top-to-bottom distance. For a third portion of the top-to-bottom distance the side surfaces 136a, 138a extend outward to form a pair of symmetrical ledges 140a, 142a before extending downward again to join the bottom surface 134a. These ledges 140a, 142a may be substantially parallel to the bottom surface 134a or may have a slight downward slope toward the bottom surface 134a. On either side of the slat 130a, at the junctions where the top surface 132a meets the side surfaces 136a, 138a, are grooves 144a, 146a which extend longitudinally beneath the top surface 132a and adjacent the side surfaces 136a, 138a.

The connector-spacer 170 used with the alternate embodiment has a substantially flat top surface 172 and a substantially flat bottom surface 174 which is wider than the top surface 172. The side surfaces 176, 178 are shaped to follow the contours of the side surfaces 136a, 138a between the grooves 114a, 146a and the ledges 140a, 142a and, when positioned between two slats 130a, 130b, to engage the ledges 142a, 140b of adjacent slats. Accordingly, they taper outward for a first portion, extend substantially vertically for a second portion, before extending generally downward to meet the bottom surface 174. On either side of the top surface 172 are flanges 180, 182 which are shaped and sized to be received by the grooves 146a, 144b of the adjacent slats 130a, 130b. Accordingly, in this embodiment as in the first-described embodiment, there is engagement between the connector-spacer 170 and its adjacent slats 130a, 130b along four lines, including lines that are both high and low on each slat 130a, 130b.

Of importance in this embodiment is the depth of the ledges 140a, 142a (using the slat 130a as an example) and their slope. The dimensions must be selected such that the distance between the grooves 144a, 146a and the inner edges of the ledges 140a, 142a (nearest the reinforcing member 135a) is greater than the distance between the grooves 144a, 146a and the outer edges of the ledges 140a, 142a (farthest from the reinforcing member 135a). This ensures that the connector-spacer 170, once snapped into position on the ledges 142a, 140b will not pop out. If desired, the surfaces of the ledges 142a, 140b and the opposing surfaces of the connector-spacer 170 can be supplied with small, complementing projections (not shown) to increase interlocking.

The alternate embodiment, like the first-described embodiment has a box beam structure, no upwardly open grooves and can receive a reinforcing member. Moreover, the outer edges of the grooves 114a, 146a serve as manure drip lips and the internal compartment 133a is fully enclosed. In addition, the slats 130a, 130b and the connector-spacer 170 are assembled in essentially the same way as in the first embodiment, except that snapping in the connector-spacer 170 requires lateral as well as upward force. Accordingly, this embodiment offers much the same advantages of ease of assembly, sanitariness and strength as the first embodiment.

The description of the preferred embodiments herein is quite specific. Those skilled in the art will perceive modifications which can be made in these specific embodiments without departing from the spirit of the invention. Accordingly, it is intended by the appended claims to cover all such embodiments as fall within the true spirit and scope of the invention.

What is claimed as new and desired to be secured by Letters Patent of the United States is:

1. A slatted floor system comprising:
    a plurality of elongated, spaced, generally parallel slats, each slat having
        a top, load carrying surface with spaced-apart, opposite outer edges,
        a bottom surface substantially parallel to said top surface,
        a pair of side surfaces integral with said top surface and said bottom surface, said side surfaces being joined with the top surface along lines recessed from the outer edges of the top surface, said side surfaces further tapering toward each other in first portions adjacent the top surface, then extending substantially parallel to each other and vertically relative to said bottom surface in second portions thereby forming with said top and bottom surfaces a generally Y-shaped, integral, fully enclosed longitudinal main compartment,
        a first pair of projection receiving means extending longitudinally along said tapered first portion of the side surfaces, and
        a second pair of projection receiving means extending longitudinally along said second portions of the side surfaces;
    a plurality of connectors, for connecting and locking adjacent slats in spaced-apart relationship, each connector having a first pair of projections, each such projection being receivable by one of said first pair of projection receiving means on each of two adjacent slats, and a second pair of projections, each such projection being receivable by one of said second pair of projection receiving means on each of two adjacent slats, at least one of said first and second pairs of projections being adapted to interlock with its corresponding projection receiving means on adjacent slats; and
    a plurality of reinforcing members internally received in, fully enclosed by, and extending substantially the full length of, said longitudinal main compartments of said slats.

2. The slatted floor system recited in claim 1 wherein said top surface is curved such that it is concave in the direction of said bottom surface.

3. The slatted floor system recited in claim 2 wherein the top surface has a number of ribs extending longitudinally along it which are interrupted at intervals to form a grid of short, rectangular projections from said top surface.

4. The slatted floor system recited in claim 1 wherein said first pair of projection receiving means on said slat comprises a flange extending generally downwardly from each of said outer edges of said top surface to form a pair of grooves open generally in the direction of said bottom surface, said second pair of projection receiving means on said slat means comprises outward extensions of said side surfaces below said second portion of said side surfaces, said outward extensions forming a first pair of ledges substantially vertical to said side surfaces, said first pair of projections on said connector comprise a pair of generally upwardly directed flanges, each flange being receivable in one of said pair of grooves on each of two adjacent slats, and said second pair of projections on said connectors comprise a second pair of ledges, each ledge being adapted to interlock with one of said first pair of ledges on each of two adjacent slats.

5. A slatted floor system comprising:
    a plurality of elongated, spaced, generally parallel slats, each slat having
        a top, load carrying surface with spaced-apart, opposite outer edges,
        a bottom surface substantially parallel to said top surface,
        a pair of side surfaces integral with said top surface and said bottom surface, said side surfaces being joined with the top surface along lines recessed from the outer edges of the top surface, said side surfaces further tapering toward each other in first portions adjacent the top surface, then extending substantially parallel to each other and vertically relative to said bottom surface in second portions thereby forming with said top and bottom surfaces a generally Y-shaped enclosed main compartment,
        a first pair of projection receiving means extending longitudinally along said tapered first portion of the side surfaces,
        a second pair of projection receiving means extending longitudinally along said second portions of the side surfaces, and
        a pair of channels having spaced-apart opposite edges, each of said channels extending longitudinally along said tapered first portion of said side surfaces and being connected at one edge to an outer edge of said top surface and at the other edge to the side surface adjacent said outer edge such that said pair of channels, said top surface and said side surfaces cooperate to form first and second enclosed side compartments; and
    a plurality of connectors, for connecting and locking adjacent slats in spaced-apart relationship, each connector having a first pair of projections, each such projection being receivable by one of said first pair of projection receiving means on each of two adjacent slats, and a second pair of projections, each such projection being receivable by one of said second pair of projection receiving means on each of two adjacent slats, at least one of said first and second pairs of projections being adapted to interlock with its corresponding projection receiving means on adjacent slats.

6. The slatted floor system recited in claim 5 wherein said first pair of projection receiving means on each slat comprises a first pair of grooves open toward said bottom surface, one of said pair of grooves extending along one side surface of each slat, each groove of said pair of grooves being formed between one of said channels and the adjacent side surface, and wherein said first pair of projections on each connector comprises a first pair of upwardly extending flanges, each flange being receivable by one of said first pair of grooves on each of two adjacent slats.

7. The slatted floor system recited in claim 6 further comprising a rib extending longitudinally along each of said pair of channels, said ribs being substantially parallel to and in spaced relation with the outer edges of said top surface.

8. The slatted floor system recited in claim 6 wherein said second pair of projection receiving means on each slat comprises a pair of longitudinally extending, angle-bent flanges integral with said pair of side surfaces and located between said first pair of projection receiving means and said bottom surface, said pair of angle-bent flanges and said side surfaces forming between them a second pair of grooves open toward said bottom surface, one groove being on each side of said slat; and said second pair of projections on each connector comprises a second pair of generally upwardly extending flanges, each flange being receivable by one of said second pair of grooves on each of two adjacent slats.

9. The slatted floor system recited in claim 8 further comprising a rib extending longitudinally along the inside of each of said second pair of grooves on each slat and a rib extending longitudinally along said second pair of generally upwardly directed flanges on each connector, said ribs and the size of said second pair of grooves being adapted such that said second pair of flanges are received in said second pair of grooves in an interlocking manner.

10. The slatted floor system recited in claim 5 further comprising a plurality of reinforcing members internally received in, and extending substantially the full length of, said main compartments of said slats.

11. A slatted floor system comprising:
a plurality of elongated, spaced, generally parallel slats, each slat having
  a top, load carrying surface with spaced-apart, opposite outer edges,
  a bottom surface substantially parallel to said top surface,
  a pair of side surfaces integral with said top surface and said bottom surface, said side surfaces being joined with the top surface along lines recessed from the outer edges of the top surface, said side surfaces further tapering toward each other in first portions adjacent the top surface, then extending substantially parallel to each other and vertically relative to said bottom surface in second portions thereby forming with said top and bottom surfaces a generally Y-shaped enclosed main compartment,
  a first pair of projection receiving means extending longitudinally along said tapered first portion of the side surfaces, and
  a second pair of projection receiving means extending longitudinally along said second portions of the side surfaces;
a plurality of connectors, for connecting and locking adjacent slats in spaced-apart relationship, each connector having a first pair of projections, each such projection being receivable by one of said first pair of projection receiving means on each of two adjacent slats, and a second pair of projections, each such projection being receivable by one of said second pair of projection receiving means on each of two adjacent slats, at least one of said first and second pairs of projections being adapted to interlock with its corresponding projection receiving means on adjacent slats; and
conduit means connected to at least one of said first pair or second pair of longitudinally extending projection receiving means and located below the top surfaces of said plurality of slats.

12. The slatted floor system recited in claim 11 wherein said conduit means comprises:
an elongated channel member; and
means for connecting said channel member below at least one of said slats whereby said channel member and the bottom surface of the slat form a substantially enclosed conduit.

13. The slatted floor system recited in claim 11 wherein said conduit means comprises elongated fluid conducting means connected to said floor system.

14. The slatted floor system recited in claim 13 wherein said fluid conducting means has a plurality of openings therein and said floor system further comprises deflection means connected to said fluid conducting means for directing fluids passing through said plurality of openings.

15. The slatted floor system recited in claim 1 further comprising drip lip means affixed to each of said plurality of slats.

* * * * *